US006569447B2

(12) United States Patent
Kisic et al.

(10) Patent No.: US 6,569,447 B2
(45) Date of Patent: May 27, 2003

(54) COMBINATION OF PLASMA AND HYPERIMMUNIZED PRODUCTS FOR INCREASED PERFORMANCE

(75) Inventors: Julie A. Kisic, Eaton, CO (US); Thomas E. Shipp, Marine, IL (US)

(73) Assignee: Trouw Nutrition USA, LLC, Highland, IL (US)

( * ) Notice: Subject to any disclaimer, the term of this patent is extended or adjusted under 35 U.S.C. 154(b) by 0 days.

(21) Appl. No.: 09/815,974

(22) Filed: Mar. 23, 2001

(65) Prior Publication Data

US 2002/0122803 A1 Sep. 5, 2002

Related U.S. Application Data

(60) Provisional application No. 60/192,066, filed on Mar. 24, 2000.

(51) Int. Cl.[7] .................... A23K 1/165; A23K 1/17; A61K 47/00; A61K 9/14
(52) U.S. Cl. ................ 424/442; 424/439; 424/489; 424/130.1; 424/183.1
(58) Field of Search ................ 424/439, 489, 424/442, 183.1, 130.1

(56) References Cited

U.S. PATENT DOCUMENTS

| | | |
|---|---|---|
| 4,748,018 A | 5/1988 | Stolle et al. |
| 5,080,895 A | 1/1992 | Tokoro |
| 5,130,128 A | 7/1992 | Stolle |
| 5,215,746 A | 6/1993 | Stolle et al. |
| 5,367,054 A | 11/1994 | Lee |
| 5,538,727 A | 7/1996 | Stolle et al. |
| 5,585,098 A | 12/1996 | Coleman |
| 5,753,268 A | 5/1998 | Stolle et al. |
| 5,772,999 A | 6/1998 | Greenblatt et al. |
| 5,849,349 A | 12/1998 | Stolle et al. |
| 5,853,765 A | 12/1998 | Stolle et al. |
| 5,932,250 A * | 8/1999 | Stolle et al. ............. 424/581 |
| 6,004,576 A * | 12/1999 | Weaver et al. ........... 424/442 |
| 6,068,862 A | 5/2000 | Ishihara et al. |
| 2002/0012666 A1 * | 1/2002 | Greenblatt et al. ...... 424/183.1 |

FOREIGN PATENT DOCUMENTS

WO     WO 99/07236     2/1999

OTHER PUBLICATIONS

Trouw Nutrition, Material Safety Data Sheet, Jun. 1, 2001, USA.

Godfredson–Kisic, The Effects of Various Concentrated Immunoglobulin Protein Sources in Phase I Diets of Early Weaned Pigs, J. of An. Sci., Jul., 1999, vol. 77 (Supp. 1) p. 174, USA.

James, et al., Comparison on Inedible Egg Protein and Spray—Dried Plasma as Sources of Protein for Weanling Pigs, *Nutrition*, 1999, Iowa State University, Ames, IA, USA.

Derouchey, et al., Effects of Irradiation Processing of Specialty Protein Products on Nursery Pig Performance, Swine Day Report of Progress 858, 2000, Kansas State University Agricultural Experiment Station and Cooperative Extension Service, Manhattan, KS, USA.

Harmon, et al., Spray Dried Eggs as an Ingredient in Diets for SEW Pigs, Purdue University Swine Day Report, Aug. 31, 2000, Purdue University, West Lafayette, IN, USA.

* cited by examiner

*Primary Examiner*—Thurman K. Page
*Assistant Examiner*—Robert M. Joynes
(74) *Attorney, Agent, or Firm*—Stinson Morrison Hecker LLP

(57) ABSTRACT

The invention is a performance-enhancing feed supplement. The feed supplement is made up of a combination of spray-dried porcine plasma and spray-dried hyperimmune egg. The feed supplement is effectively administered to increase performance when weanling pigs and calves.

10 Claims, No Drawings

COMBINATION OF PLASMA AND HYPERIMMUNIZED PRODUCTS FOR INCREASED PERFORMANCE

RELATED APPLICATIONS

This application claims the benefit of U.S. Provisional Application No. 60/192,066, filed on Mar. 24, 2000.

BACKGROUND OF THE INVENTION

Spray dried porcine plasma (SDPP) is a popular protein source which is added to weanling animal diets. Typically, it is fed at the highest concentration (4 to 10%) during phase I (early phase) of the weanling's life. The SDPP concentration is then reduced as the animal advances in age and is eventually removed from the diet after three to four weeks post-weaning. Many studies have established that feeding SDPP to animals can significantly improve performance (growth rate, weight gain, feed efficiency, and lean mass or muscle yield) of those animals in comparison to increases seen with other protein sources used in the business. The greatest effects of SDPP are typically witnessed during the first week post-weaning and its influence is most pronounced when fed to pigs reared in challenging environments.

A newer method for improving performance of animals involves the administration to such animals of spray-dried hyperimmunized egg or milk. In the particular case of egg, the hyperimmunized egg is obtained from an avian which has been hyperimmunized with a vaccine comprising one or more specific immunogens. The hyperimmunization process causes the avian to undergo an immune response and antibodies to these immunogens are formed within the avian. These antibodies tend to accumulate in the hyperimmunized chickens' eggs. As such, many in the art have begun feeding these antibody rich eggs to animals in order to treat certain diseases or disorders and thus render a better performing animal.

SUMMARY OF THE INVENTION

In one aspect, the invention is directed to a performance-enhancing feed supplement comprising a combination of plasma and an egg product, said egg product obtained from an avian hyperimmunized with one or more antigens.

In another aspect, the invention is directed to a method for enhancing performance of weanling pigs and calves comprising the administration to said weanling pigs and calves of an effective amount of a feed supplement comprising a combination of plasma and an egg product, said egg product obtained from an avian hyperimmunized with one or more antigens.

DESCRIPTION OF THE INVENTION

It is applicants' discovery that when plasma is administered to an animal in combination with hyperimmunized egg, there is a synergistic increase in performance in that animal.

The plasma/egg product of the invention is a natural animal protein supplement composed of animal plasma, dried egg product, animal serum, serum albumin, and serum globulin. Plasma, serum, serum albumin and serum globulin are collected from USDA inspected bovine and porcine slaughter plants, preferably based within the United States. Eggs are collected from United States based flocks. Plasma proteins and eggs are dried separately. The individual components are then combined to make the final plasma/egg product.

Preparation of Hyperimmune Egg Product

The hyperimmune egg product can be produced by any egg-producing animal. It is preferred that the animal be a member of the class Aves or, in other words, an avian. Within the class Aves, domesticated fowl are preferred, but other members of this class, such as turkeys, ducks, and geese, are a suitable source of hyperimmune egg product.

The hyperimmune egg product is provided as a spray dried egg powder and is obtained from laying hens vaccinated with certain specific disease-causing pathogens. Example 1 discloses a preferred spectrum of pathogens especially effective for use in the present invention. The process of spray drying the pasteurized liquid egg minimizes damage to the antibodies in the egg, resulting in a product that has a high nutrient value and is capable of conferring passive protection to opportunistic enteric infections. Antibodies, as a group, are especially resistant to destruction by normal enzymes, and upon oral consumption, a significant fraction will pass through the gastrointestinal tract intact and active. Numerous studies report that orally consumed antibodies offer protection against specific enteric agents.

Having knowledge of the requirement for developing and maintaining a hyperimmune state, it is within the skill of the art to vary the amount of immunogen administered, depending on the egg-producing animal genera and strain employed, in order to maintain the animal in the hyperimmune state.

Alternative modes of hyperimmunizing egg producing animals can be used which, in place of immunogenic vaccines, include the use of genetic vaccines. In particular, any DNA construct (generally consisting of a promoter region and an immunogen encoding sequence) will trigger an immune response. Genetic vaccines consist of immunogen-coding vectors, fragments of naked DNA, plasmid DNA, DNA-RNA antigens, DNA-protein conjugates, DNA-liposome conjugates, DNA expression libraries, and viral and bacterial DNA delivered to produce an immune response. Methods of DNA delivery include particle bombardment, direct injection, viral vectors, liposomes and jet injection, among others. When applying these delivery methods, much smaller quantities may be necessary and generally result in more persistent immunogen production. When using such genetic processes, the preferred method for introducing DNA into avians is through intramuscular injection of the DNA into the breast muscle.

Plasma Collection

Plasma is a component of whole blood. In order to separate out the plasma, the whole blood is preferably treated with anticoagulant (i.e. Sodium Citrate) and then is pumped through a continual flow centrifuge to separate the plasma from the cellular components of blood. The resulting product is then preferably concentrated, for example through high-pressure membrane filtration, which also serves to remove most of the anticoagulant previously added. During processing it is preferred that the plasma is chilled to about 3° C. Once concentrated, plasma is transferred to storage tanks that can maintain the temperature between 3–6° C. In the preferred embodiment, the plasma is eventually spray dried, and packaged. Whole blood is preferably collected from USDA inspected bovine and porcine slaughter plants based in the United States. Plasma is a natural biological product that is harvested, not manufactured or fabricated.

Sprayed Dried Porcine Plasma

Spray dried porcine plasma (SDPP) has three major protein groups (fibrinogen, globulin and albumin). Studies were conducted with mice to determine the active fraction of plasma with respect to performance. During week one, mice fed purified globulins exhibited equal gains to mice fed SDPP and higher than mice fed fibrinogen or albumin. By week three, all mice fed fractionated plasma proteins had gains equal to mice fed SDPP which suggested that during the first week, the globulin fraction was responsible for the initial response in growth. The following examples show the effects of the plasma/egg product of the invention in terms of increasing performance of certain animals.

EXAMPLES

Example 1

Preparation of Protimax Vaccine

The multivalent vaccine known as "Protimax" contains the bacteria shown in Table 1. The Protimax vaccine was reconstituted with 15 ml of medium and incubated overnight at 37C. Once good growth was obtained, approximately one-half of the bacterial suspensions were used to inoculate one liter of broth which was then incubated at 37C. The remaining suspension was transferred to sterile glycol tubes and stored at −20C. for up to six months.

After good growth was visible in the culture, the bacteria were harvested by centrifugation. The bacterial pellet was resuspended in sterile physiological saline solution and the bacterial sample was centrifuged three times to wash the cells. After the third wash, the pellet obtained was resuspended in a small amount of double distilled water.

The medium-free bacterial suspension was heat-killed by placing the suspension in a glass flask in an 80C. water bath overnight. The viability of the broth culture was tested with a small amount of heat-killed bacteria. Both was inoculated with heat-killed bacteria, incubated at 37C. for five days and checked daily for growth, as the bacteria have to be killed for use in the vaccine.

The heat-killed bacteria were lyophilized until dry. The dry bacteria were then mixed with sterile saline solution to a concentration of $2.2 \times 10^8$ bacterial cells/ml saline (1.0 optical density reading at 660 nm).

TABLE 1

COMPONENTS OF PROTIMAX VACCINE

| SL 503 | Bio 1000 E | Bio 1000 PW |
|---|---|---|
| Salmonella Typhimurium | Clostridium Perfingens | Ecoli 1362 |
| Salmonella Cholerasis | Ecoli 987 P | Ecoli 2134 |
| Salmonella Enteritidus | Ecoli F41 | Ecoli 263 |
| Salmonella Dubin | Ecoli K88 | Ecoli J5 |

TABLE 1-continued

COMPONENTS OF PROTIMAX VACCINE

| SL 503 | Bio 1000 E | Bio 1000 PW |
|---|---|---|
| Salmonella Heidleberg | Ecoli K99 | |
| E coli J5 | Porcine Rotavirus | |

Immunization Procedure for Hyperimmune Egg Product

A killed preparation of pathogens was prepared as described above. For the first vaccination, the bacteria were mixed with complete Freund's adjuvant, and 5.6 mg of bacterial material were injected into the breast muscle of a chicken. For the remaining vaccines, the bacterial preparation was mixed with the incomplete Freund's adjuvant and injected into the chickens at two-week intervals for six months.

Eggs were collected from the hyperimmunized chickens and then sprayed dried into powder form. During the spray drying procedure, inlet temperatures did not exceed 320 Degrees F., exhaust temperatures were maintained in accordance with producing powder in the range of 3.0 to 4.0 percent finished moisture, and pump pressure was maintained around 2500 to 4000 P.S.I. Lower temperatures ranging from 100–160 F. were used, and samples were monitored for moisture contend during the drying process to obtain a final product having any consistency desired.

Example 2

A Bioassay Used to Identify the Active Fraction of Spray-Dried Plasma

Introduction

A bioassay was developed using mice to study effects of spray dried porcine plasma (SDPP) in diets of young pigs. Our objective was to use the bioassay to identify the active protein fractions of SDPP.

Materials and Methods

Male mice (n=100), 21 days of age were assigned to one of five treatments. The control diet consisted of dry skim milk (DSM). The other diets had 8% SDPP, 4% fibrinogen, 4% globulin, or 4% albumin proteins fractionated form whole porcine plasma. Diets were formulated on an equal lysine basis. The trial was conducted for a 21 day period, at the end of each week, weight and feed intake were measured.

Results

During week 1, average weekly gain (AWG) of mice fed SDPP and globulin was greater than (P<0.001) all other mice. Gain to feed (G/F) was also greater than mice on the fibringogen (P<0.06), albumin and control diets (P<0.001). On week 2, mice fed control, albumin and fibrinogen diets, exhibited compensatory gain. By week 3 all mice had higher AWG (P<0.01) than control mice.

TABLES

GROWTH RATE, FEED INTAKE AND FEED EFFICIENCY OF MICE FED CONTROL, SDPP AND PLASMA PROTEIN DIETS

| Days | Control | SDPP | Fibrinogen | Globulin | Albumin |
|---|---|---|---|---|---|
| d 0–7 | | | | | |
| $AWG^1$ | $5.37 \pm 0.43^b$ | $8.12 \pm 0.06^a$ | $5.96 \pm 0.33^b$ | $7.69 \pm 0.47^a$ | $3.67 \pm 0.39^c$ |
| $AWFI^2$ | $20.78 \pm 0.25^a$ | $21.79 \pm 0.66^a$ | $20.97 \pm 1.40^a$ | $19.00 \pm 0.50^a$ | $19.49 \pm 1.46^a$ |
| $G/F^3$ | $0.26 \pm 0.02^b$ | $0.38 \pm 0.03^a$ | $0.30 \pm 0.03^b$ | $0.41 \pm 0.02^a$ | $0.19 \pm 0.02^c$ |

TABLES-continued

GROWTH RATE, FEED INTAKE AND FEED EFFICIENCY OF MICE FED CONTROL, SDPP AND PLASMA PROTEIN DIETS

| Days | Control | SDPP | Fibrinogen | Globulin | Albumin |
|---|---|---|---|---|---|
| d 7–14 | | | | | |
| AWG | 8.50 ± 0.56$^a$ | 6.13 ± 052$^b$ | 8.26 ± 0.53$^a$ | 6.70 ± 016$^b$ | 8.37 ± 0.33$^a$ |
| AWFI | 27.14 ± 1.36$^a$ | 26.72 ± 2.02$^a$ | 28.55 ± 1.17$^{ab}$ | 31.46 ± 1.44$^b$ | 31.92 ± 0.72$^b$ |
| G/F | 0.32 ± 0.03$^a$ | 0.23 ± 0.02$^b$ | 0.29 ± 0.01$^a$ | 0.22 ± 001$^b$ | 0.26 ± 0.01$^a$ |
| d 14–21 | | | | | |
| AWG | 3.27 ± 0.18$^a$ | 3.92 ± 0.16$^b$ | 3.94 ± 0.17$^b$ | 3.97 ± 018$^b$ | 4.16 ± 0.18$^b$ |
| AWFI | 25.70 ± 2.18$^a$ | 22.02 ± 7.20$^a$ | 23.10 ± 0.64$^a$ | 23.33 ± 3.06$^a$ | 23.76 ± 1.25$^a$ |
| G/F | 0.14 ± 0.02$^a$ | 0.18 ± 0.01$^a$ | 0.20 ± 0.03$^a$ | 0.18 ± 0.01$^a$ | 0.17 ± 0.01$^a$ |

$^1$AWG, $^2$AWFI, $^3$G/F: average weekly grain and feed intake in grams per mouse, and gain to feed ratios per mouse.
$^{abc}$Values with different letters are significantly different (P ≤ 0.05).

Conclusions

The results of this trial suggest that the components of plasma responsible for improvements in gain and feed conversion witnessed in swine reside within the globulin fraction of plasma.

Example 3

An Evaluation of the Effects of Increasing Dietary Concentrations of Porcine Globulin Proteins Using a Mouse Bioassay Introduction Previous trials conducted by our group demonstrated that growth rate and feed efficiency were equivalent between mice fed 4% globulin protein, and 8% SDPP supplemented diets. Having established that the globulin fraction of plasma as the active fraction in animal diets, the objective of this trial was to compare different concentrations of globulin proteins in the diets of weaned mice with a diet of whole SDPP, and determine if there would be a dose response to concentrated globulin proteins.

Materials and Methods

One hundred male mice were weaned between 20 and 22 days of age. Mice were weighed, and randomly assigned to one of five treatment diets (n=20). Mice were housed two per cage and allowed ad libitum access to food and water throughout the 21 day trial. Feed consumption was monitored daily, and mice were weighed weekly on days 0, 7, 14 and 21. Concentrated plasma was used for protein fractionation. A common ammonium sulfate method of plasma fractionation was used to isolate crude preparations of globulin proteins. Mouse diets consisted of DSM as the protein base. The control diet was supplemented with 8% whole SDPP. The remaining diets were supplemented with either 2, 4, 8 or 12% globulin. All diets were formulated to be equal in protein and lysine.

Results

During the initial week of the trial average daily gain (ADG) was similar for all mice with the exception of a reduction in growth rate for mice fed the 12% globulin diets (P<0.001). Average daily feed intake (ADFI) was also numerically lower for these mice, but not enough to offset G/F. During the second week, ADG and G/F were similar for all mice in the trial, however, mice fed 2% globulin diets had numerically improved feed efficiency. By week three ADG and G/F still remained strong for the 2% globulin fed mice numerically and significantly. This holds true when observing entire three week averages. Feed intake for the full three weeks of the trial were similar for all mice.

TABLES

| | DIET: | | | |
|---|---|---|---|---|
| | 8% SDPP | 2% Globulin | 8% Globulin | 12% Globulin |
| ADG (g/day) | 0.89 ± 0.02$^{ab}$ | 0.91 ± 0.02$^a$ | 0.87 ± 0.02$^{ab}$ | 0.72 ± 0.02$^c$ |
| Gain/Feed | 0.30 ± 0.01$^a$ | 0.34 ± 0.02$^a$ | 0.32 ± 0.010$^a$ | 0.26 ± 0.01$^b$ |

Value with different superscripts are significantly different (P<0.05).

Conclusions

This study supports the previous trial in that the globulin fraction of plasma holds the key elements to SDPP's dietary success. Additionally, these results suggest that smaller amounts of concentrated globulin proteins are as effective in influencing growth traits as larger quantities naturally found in diets supplemented with whole SDPP. By concentrating the globulin protein fraction of plasma, less may be required to witness the same effects as feeding larger dosages of whole SDPP.

Example 4

The Effects of Various Concentrated Immunoglobulin Protein Sources in Phase I Diets of Early Weaned Pigs Introduction Previous trial have shown that plasma protein fractions to be as effective as whole SDPP in the diets of younger animals but at lower concentrations. The objective of this trial was to compare Phase I swine nursery diets supplemented with whole SDPP, plasma globulin fractions or a combination of plasma proteins and hyperimmunized egg (Protimax®).

Materials and Methods

A total of 160 weaned barrows (13 days old, 4.2 Kg body weight) were blocked by weight to one of four treatment diets, 4 pens/trt, 10 pigs/pen. Treatment diets offered were supplemented with either: 1) 8% SDPP, 2) 4% plasma globulin fraction (GLOB), 3) 2% GLOB, or 4) 4% plasma fraction—hyperimmunized egg mix (ALB+). All diets were equalized for protein, lysine and energy, and were offered ad libitum for 7 days post weaning, after which gain and feed intake were measured.

Results

On day seven post weaning, ADG (g/day) for diets 1, 2, 3, and 4 were 113, 101, 116, 149 (P<0.08) respectively. ADFI (g/day) for diets 1, 2, 3, and 4 were 130, 122, 127, 156 (P<0.07) and G/F values were 0.88, 0.83, 0.90, 0.95 (P<0.1), respectively. Feed intake and ADG approached significance for animals fed the ALB+ supplemented diets.

Conclusions

This study supports previous trials were 2% globulin fraction is as effective and more so than diets containing whole SDPP. Surprisingly, animals whose diets were supplemented with the combination of plasma protein fractions and hyperimmunized egg (ALB+) out performed all other animals offered diets with SDPP or the globulin protein fraction of SDPP. These results suggest a synergistic effect of combining immunoglobulin proteins from plasma and hyperimmunized egg sources.

Example 5

ProtiOne™ Versus Plasma in Phase I and Phase II Swine Starter Diets

Introduction

Currently there are available many types of plasma extenders, fillers and overall plasma replacement products. Although a few studies have shown a slight improvement in gain during the $4^{th}$ and $5^{th}$ week post weaning, no one has ever demonstrated that any of these products can actually out perform plasma the first and second week post weaning. Our goal was to determine if supplementing both phase I and phase II diets with ProtiOne™ results in improved gain and feed efficiency over diets supplemented with plasma specifically during the first week post weaning.

Materials and Methods

A field study with crossbred weanling pigs was conducted in Minnesota. Our objective was to compare the effects of ProtiOne™ versus Spray Dried Plasma on gain and feed efficiency. A total of 80 pigs were used grouped by eight pigs per pen and five pens per treatment diet. Pigs were weaned at an average weight of 5.7 kg. At weaning pigs were placed on a basal phase I diet supplemented with either 6% spray dried porcine plasma or 6% ProtiOne™. Phase I diets were offered for 13 days post-weaning after which pigs were placed on a phase II diet containing 6% plasma or 6% ProtiOne™ for an additional 16 days. Individual body weights were recorded at weaning and at the completion of each phase. Feed intake was measured per pen after each phase as well. The results are reported in the following table.

Results

Feed efficiency was improved throughout the trial, most notably during phase II where there was a 9% improvement. The greatest differences between the two diets were witnessed with weight gain and average daily gain (ADG). Significant improvement was observed in pigs fed diets containing ProtiOne™ during both phases, and most dramatically during phase I of the trial. Pigs fed ProtiOne™ had a 30% increase in ADG during phase I and a 20% improvement during phase II. Overall body weights were heavier for ProtiOne™ fed pigs at the conclusion of the trial. ProtiOne™ not only improved feed efficiency and gain over plasma but accomplished this the first two weeks post weaning and maintained performance throughout phase I and II periods.

TABLES

| Diet | Number of Pigs | Wt. Gain/Pig (lb.) | ADG/Pig (lb.) | Feed/Gain |
|---|---|---|---|---|
| PROTIONE ™ VERSUS PLASMA | | | | |
| PHASE I | | | | |
| 6% Plasma | 40 | 6.68 | 0.514 | 1.17 |
| 6% ProtiOne ™ | 40 | 9.57 | 0.732 | 1.16 |
| PHASE II | | | | |
| 6% Plasma | 40 | 12.46 | 0.780 | 1.75 |
| 6% ProtiOne ™ | 40 | 15.43 | 0.968 | 1.59 |

Conclusion

Feed efficiency was improved throughout the trial, most notably during phase II where there was a 9% improvement in feed/gain ratio. The greatest differences between the two treatment diets were witnessed with weight gain and average daily gain (ADG). Significant improvements in gain and ADG were observed in pigs fed diets containing ProtiOne™ during the entire study and most dramatically during phase I of the trial. Pigs fed ProtiOne™ demonstrated a 30% increase in ADG during phase I and 20% improvement during phase II. Overall body weights were heavier for ProtiOne™ fed pigs at the conclusion of the trial. ProtiOne™ not only improved feed efficiency and gain over plasma but was also able to accomplish this the first two weeks post weaning and maintain performance throughout both the phase I and phase II periods. No one as of yet has demonstrated a product capable of out performing plasma in the first weeks post weaning until now.

Example 6

A Comparison of Various Concentrations of ProtiOne™ with Plasma

Introduction

In Example 5, we reported that by supplementing phase I and II starter diets with ProtiOne™, feed efficiency is improved and average daily gain is significantly increased versus pigs receiving diets supplemented with plasma. Our goal in this trial was to determine the affects of varying dietary concentrations of ProtiOne™ in comparison to plasma and to demonstrate similar findings to the first study.

Materials and Methods

Two hundred crossbred 14-day-old barrows were utilized in a randomized complete block design and assigned to treatment diets supplemented with either ProtiOne™ or plasma. ProtiOne™ was supplemented at 4% or 2% of the total diet, and plasma was supplemented at either 6% or 2% of the total diet. The pigs were blocked according to body weight and randomly assigned to their respective dietary treatments. Data was recorded for average daily gain (ADG), average daily feed intake (ADFI) and feed efficiency (FE) for weeks 1, 2 and overall (weeks 1–2).

Results

Data is reported in the adjacent table. During the first week pigs fed 4% ProtiOne™ experienced growth rates and feed conversion equivalent to pigs fed the 6% plasma (P>0.05). However, pigs fed 4% ProtiOne™ grew faster (P<0.05) than pigs fed 2% plasma. No significant differences were seen for feed efficiency during the first week. During week two, ADG and FE for pigs fed 6% plasma, 4% ProtiOne™ and 2% ProtiOne™ were equivalent and significantly greater than that of pigs fed 2% plasma. Overall (weeks 1–2) improvements for FE were observed for pigs fed 6% plasma, 4% ProtiOne™ in comparison to pigs fed 2% ProtiOne™ and 2% plasma. No differences were found in ADFI regardless of week or treatment.

TABLES

|  | 6% Plasma | 4% ProtiOne ™ | 2% ProtiOne ™ | 2% Plasma | SEM |
|---|---|---|---|---|---|
| WEEK 1 | | | | | |
| ADG, lbs. | 0.42a | 0.40a | 0.31b | 0.31b | 0.01 |
| ADFI, lbs. | 0.62 | 0.56 | 0.53 | 0.50 | 0.02 |
| FE | 1.45 | 1.41 | 1.80 | 1.64 | 0.08 |
| WEEK 2 | | | | | |
| ADG, lbs. | 0.89a | 0.82a | 0.81a | 0.72b | 0.02 |
| ADFI, lbs. | 1.27 | 1.23 | 1.24 | 1.18 | 0.02 |
| FE | 1.43a | 1.48a | 1.52a | 1.67b | 0.03 |
| WEEK 1–2 | | | | | |
| ADG | 0.66a | 0.61ab | 0.56bc | 0.52c | 0.01 |
| ADFI, lbs. | 0.94 | 0.89 | 0.88 | 0.84 | 0.02 |
| FE | 1.45a | 1.44a | 1.66b | 1.66b | 0.04 |

Conclusion

This study confirms our last trial in that on a "pound for pound" basis, ProtiOne™ can significantly improve gain and FE in the first two weeks post weaning over that of dietary plasma. Additionally, this trial demonstrates that an inclusion rate of 4% ProtiOne™ results in growth rates and feed conversions equal to that of 6% plasma. Using ⅓ less ProtiOne™ in the diet will result in significant cost savings for the end user.

Example 7

Evaluation of Protione Versus Spray Dried Porcine Plasma for Two Week Old Weanling Pigs ProtiOne (PO) is the protein product consisting primarily of porcine globulin and Protimax. We demonstrated that pigs fed 4% PO produced effects equal to pigs fed 6% spray dried porcine plasma (SDPP). This would equate to an improvement in economics during the first week post weaning when feed cost are highest with respect to price per pound. This study was conducted to evaluate 4% PO versus 6% or 4% SDPP. An additional objective was to evaluate an alternative formulation of PO (PO+).
Materials and Methods Two hundred and sixteen 14 day old barrows (n=108) and gilts (n=108) were utilized in a randomized complete block design (RCB). Pigs were blocked by beginning body weight and randomly assigned their respective dietary treatments. Pigs were housed in tandum pens sharing a common feeder. Nine barrows occupied one side and nine gilts were placed on the other side of the common feeder. Dietary treatments were as follows: 1) Control, 6% SDPP; 2) Negative Control, 4% SDPP; 3) 4% PO; and 4) 4% PO+. All diets were equivalent in nutrients. Pigs were allowed ad libitum access to water and their respective dietary treatments for 13 days. Pigs were weighed weekly and ADG, average daily feed intake (ADFI) and gain to feed (GF) were calculated. Pigs were treated with the farms typical vaccination schedule and subsequent medications were given as designated by the farms normal operating procedures. Data was analyzed by a split plot arrangement of treatments in a RCB. Average daily feed intake and GF were analyzed by RCB.
Results During week one, no significant differences were determined for ADG or ADFI. However, there was a tendency for pigs fed 6% SDPP or 4% PO to grow faster than 4% SDPP or 4% PO+ (232, 233, 210, 197 g respectively). Pigs fed 6% SDPP or 4% PO grew 8.5 and 15.9% faster than 4% SDPP and PO+ fed pigs, respectively. Pigs fed 6% SDPP or 4% PO were equal (P>0.1) with respect to GF and were higher (P<0.06) than pigs fed 4% SDPP. In week two, pigs fed 4% PO grew faster (P<0.03) and had a higher (P<0.07) GF than pigs fed 4% SDPP or 4% PO+. Average daily feed intake did not differ among dietary treatments (P>0.2). Over the two week trial, no significant differences were determined for ADG (P<0.13) or ADFI (P>0.2) However, GF was higher for pigs fed 4% PO over pigs fed 4% SDPP or 4% PO+.
Conclusion Once again, this study shows that 4% PO performs as well as 6% SDPP during the first two weeks post weaning with two-week-old pigs. Furthermore, supplementation with 4% PO offers an advantage over pigs fed 4% SDPP. Additionally, the lowest inclusion level of SDPP tends to not offer the performance found in higher plasma inclusion rates with two-week-old pigs.

|  | 6% SDPP | 4% SDPP | 4% PO | 4% PO+ | Prob |
|---|---|---|---|---|---|
| ADG d 0–6 (g/d) | 232 | 210 | 233 | 197 | P > .2 |
| ADG d 6–13 (g/d) | 284ab | 248b | 309a | 267b | P < .03 |
| ADG d 0–13 (g/d) | 260 | 231 | 274 | 235 | P < .13 |
| ADFI d 0–6 (g/d) | 273 | 282 | 273 | 259 | P > .2 |
| ADFI d 6–13 (g/d) | 386 | 346 | 378 | 377 | P > .2 |
| ADFI d 0–13 (g/d) | 334 | 319 | 330 | 322 | P > .2 |
| GF d 0–6 | 0.85a | 0.74b | 0.85a | 0.76ab | P < .11 |
| GF d 6–13 | 0.74ab | 0.72b | 0.82a | 0.71b | P < .07 |
| GF d 0–13 | 0.78ab | 0.72b | 0.83a | 0.73b | P < .02 |

Example 8

Gain and Feed Efficiency of Nursery Swine Fed Diets Supplemented with ProtiOne™ or Plasma Introduction We have reported that weight gain and feed efficiency of pigs fed diets supplemented with 4% ProtiOne™ was equal to pigs receiving diets supplemented with 6% SDPP. Our studies also suggest that when ProtiOne™ is fed in equal amounts as plasma, pigs show significant improvement in gain and FE. Our goal is to repeat this data by comparing diets supplemented with 6% and 4% plasma to diets with 4% ProtiOne™.
Materials and Methods 162 14-day-old barrows and guts were used in a RCB design. Pigs were blocked by weight and randomly assigned to treatment diets. Pigs were housed in tandem pens with a common feeder. Nine (9) barrows occupied one side and nine (9) guts were on the other side of a common feeder. Treatments were as follows: 1) 6% spray dried porcine plasma (SDPP); 2) 4% ProtiOne™; and 3) 4% SDPP. All diets were equal in nutrients, and fed ad libitum for 13 days. Pigs and feed were weighed weekly.
Results Data is listed in the charts and table below. During week 1, ADG and ADFI were equal for pigs on 4% ProtiOne™ and 6% SDPP. Pigs fed ProtiOne™ grew 10.9% faster than pigs fed 4% SDPP. Pigs fed 4% ProtiOne™ and 6% SDPP were equal in FE and improved over that of pigs fed 4%

SDPP. In week 2, pigs fed 4% ProtiOne™ had better ADG and FE than pigs fed 4% plasma and showed improvement over pigs fed 6% SDPP. ADFI did not vary during the trial except week 1. For the entire trial, pigs on 4% ProtiOne™ had higher ADG than pigs fed 6% SDPP and significantly greater gain than pigs fed 4% SDPP. FE for the ProtiOne™ pigs was 9 and 13% higher than pigs fed 6 and 4% SDPP, respectively.

Conclusion

Again this study demonstrates that 4% ProtiOne™ performs equal to 6% SDPP, and has a tendency to improve gain and feed conversion in the $2^{nd}$ week post weaning over that of 6% SDPP. In trial after trial, ProtiOne™ has out performed plasma on a pound for pound basis. Furthermore, ProtiOne™ maintains accelerated gain and FE into the $2^{nd}$ week post weaning. We have confirmed yet again that an inclusion rate of 4% ProtiOne™ results in growth rates and FE equal to, if not better than, that of 6% SDPP. This provides the opportunity to use ⅓ less ProtiOne™ in starter diets and benefit from reduced feed costs.

|  | 6% SDPP | 4% SDPP | 4% ProtiOne ™ | Prob |
|---|---|---|---|---|
| ADG d 0-6 (g/d) | 232 | 210 | 233 | NS |
| ADG d 6-13 (g/d) | $284^{ab}$ | $248^b$ | $309^a$ | P<.03 |
| ADG d 0-13 (g/d) | $260^{ab}$ | 231 | $274^a$ | P<.03 |
| ADFI d 0-6 (g/d) | $273^b$ | $287^a$ | $275^{ab}$ | P<.07 |
| ADFI d 6-13 (g/d) | 386 | 346 | 378 | NS |
| ADFI d 0-13 (g/d) | 334 | 319 | 330 | NS |
| FE d 0-6 | $1.19^a$ | $1.36^b$ | $1.18^a$ | P<.03 |
| FE d 6-13 | 1.35 | 1.40 | 1.22 | NS |
| FE d 0-13 | $1.28^{ab}$ | $1.39^b$ | $1.21^a$ | P<.03 |

Means within a row with a different superscript differ according to LSD.

Example 9

A Large Commercial Scale Trial to Compare Diets Supplemented with ProtiOne™ or Plasma Introduction We have reported that gain and FE of pigs fed diets supplemented with ProtiOne™ are significantly improved over that of plasma (SDPP). This trial examines the benefits of ProtiOne™ versus SDPP, on a large commercial facility. Our goal was to demonstrate that using ProtiOne™ in place of SDPP at a large commercial facility will still result in significant improvements in gain and feed conversion, without a decline in feed intake.

Materials and Methods

A total of 930 pigs were used for this trial (462 received diets supplemented with ProtiOne™ and 468 received diets with SDPP). Pigs were weaned at 21 days of age, at which point the trial commenced. Average weight of 21 days of age, at which point the trial commenced. Average weight at 21 days of age was 12.2 lbs. There were 20 reps (pens)/treatment. The Phase I diet contained 4.25% ProtiOne™ or SDPP and was fed for a period of 7 days. After which, pigs were placed on a Phase II diet which contained 2% ProtiOne™ or SDPP for a period of 14 days.

Results

Data is listed in the charts and table below. During week 1, ADG for pigs fed Phase I diets containing ProtiOne™ was significantly higher (P<0.006) than pigs fed SDPP (0.31 and 0.26 lbs./d). Feed efficiency was also significantly improved (P<0.002) for ProtiOne™ fed pigs (1.04 and 1.18). Feed intake was higher for pigs fed ProtiOne™, and these values approached significance (P<0.06). In week 2, pigs were converted to Phase II diets during this 14-day period feed intake and FE were similar for both ProtiOne™ and SDPP fed pigs. Gain was improved in ProtiOne™ fed pigs (0.65 and 0.63), this improvement approached significance (P<0.17). Overall mortality during the trial was low, only 1.3% for ProtiOne™ fed pigs and 1.5% for SDPP fed pigs.

Conclusion

This trial confirms on a large scale basis that SDPP in Phase I and II starter diets can be completely replaced by ProtiOne™, resulting in significant improvements in both gain and FE. Furthermore, feed intake is not only maintained but actually improved when using ProtiOne™ in Phase I and II diets. When comparing animals fed ProtiOne™ versus SDPP during the Phase II period, FE and feed intake were similar, with an overall slight improvement in gain. The improvements may have been magnified had the levels of ProtiOne™ and SDPP been higher in the Phase II diets.

In trial after trial, we have shown that when ProtiOne™ is used to replace SDPP in swine starter diets significant improvements in both gain and FE are always achieved. Furthermore, the current trial demonstrates that these results can be repeated on a large commercial facility. ProtiOne™ is the only product that consistently out performs SDPP during the first weeks post weaning.

| WEEK 1 | | | |
|---|---|---|---|
|  | 4.25% SDPP | 4.25% ProtiOne ™ | Significance |
| ADG, d 0-7 | $0.26^b$ | $0.31^a$ | P<0.006 |
| ADFI, d 0-7 | $0.31^b$ | $0.32^a$ | P<0.06 |
| FE, d 0-7 | $1.18^b$ | $1.04^a$ | P<0.002 |

| WEEK 2 | | | |
|---|---|---|---|
|  | 4.25% Plasma | 4.25% ProtiOne ™ | Significance |
| ADG, d 7-21 | 0.63 | 0.65 | P<0.17 |
| ADFI, d 7-21 | 0.71 | 0.74 | NS |
| FE, d 7-21 | 1.12 | 1.13 | NS |
| Mortality | 1.5% | 1.3% |  |

Example 10

Evaluation of ProtiOne™ Versus Spray Dried Porcine Plasma Protein+Spray Dried Egg for Two Week Old Weanling Pigs Introduction Previous studies have shown benefits of using ProtiOne™ versus spray dried porcine plasma. Since ProtiOne™ consists primarily of porcine plasma, plasma fractions and hyperimmunized egg proteins we wanted to evaluate ProtiOne™ versus plasma+plain spray dried egg protein. Our goal was to establish a difference between hyperimmunized egg and plain spray dried egg in the manufacture of ProtiOne™.

Materials and Methods

Two hundred crossbred barrows were utilized in a randomized complete block design and assigned to one of the two following dietary treatments: 1) 4% ProtiOne™ (PO); and 2) 4% spray dried porcine plasma+spray dried egg (PPEGG). Pigs were an average of 14–16 days of age with an initial starting weight of 12.1 lbs. The barrows were blocked according to bodyweight and randomly assigned their respective dietary treatments. Data was collected for ADG, average daily feed intake (ADFI), and gain to feed (GF) for weeks 1, 2, and overall. Diets were equivalent in nutrients and offered ad libitum during the trial. Pigs were fed their respective dietary treatments for two weeks than were placed on the farms typical feeding regimen.

Results

Data were recorded for ADG, average daily feed intake (ADFI) and gain to feed (GF) for weeks 1, 2, and overall (Table). During the first week, pigs fed PO experienced faster gains and were more efficient than pigs fed PPEGG (P<0.05). During the second week, no differences were found for ADG or ADFI. Over the two week study, no differences were observed for growth rate; however, pigs fed PO were more efficient than pigs fed PPEGG (P<0.05). No differences in ADFI were observed over any of the periods measured.

Conclusion

This study shows that supplementation with 4% ProtiOne™ can offer superior performance over pigs fed spray dried plasma+spray dried egg during the first week post weaning. Additionally, this study confirms that there is a difference between hyperimmunized spray dried egg and plain spray dried egg during the initial weanling phase of production.

TABLE

|  | ProtiOne | SDPP + SDE | Prob |
|---|---|---|---|
| ADG, d 0-7 | 0.35a | 0.31b | .05 |
| ADG, d 7-14 | 0.55 | 0.55 | NS |
| ADG, d 0-14 | 0.45 | 0.43 | NS |
| ADFI, d 0-7 | 0.51 | 0.54 | NS |
| ADFI, d 7-14 | 0.79 | 0.83 | NS |
| ADFI, d 0-14 | 0.66 | 0.68 | NS |
| GF, d 0-7 | 0.69a | 0.57b | .05 |
| GF, d 7-14 | 0.69 | 0.67 | NS |
| GF, d 0-14 | 0.69a | 0.63b | .05 |

Means within a row with a different superscript differ according to LSD (P<.05).

What is claimed is:

1. A performance-enhancing feed supplement comprising a combination of plasma selected from the group consisting of bovine and porcine, and a spray-dried egg product obtained from an avian hyperimmunized with one or more antigens selected from the group consisting of Salmonella, E. coli, Clostridium and rotavirus.

2. The feed supplement of claim 1, wherein the antigens are further selected from the group consisting of *Salmonella typhimurium, Salmonella cholerasius, Salmonella enteritidus, Salmonella dubin, Salmonella heidleberg, Escherichia coli* J5, *Escherichia coli* 987P, *Escherichia coli* F41, *Escherichia coli* K88, *Escherichia coli* K99, *Escherichia coli* 1362, *Escherichia coli* 2134, *Escherichia coli* 263, *Escherichia coli* J5, *Clostridium perfingens* and porcine rotavirus.

3. The feed supplement of claim 1, wherein the concentration of plasma comprises approximately 97% of said supplement.

4. The feed supplement of claim 1, wherein the concentration of egg product comprises approximately 3% of said supplement.

5. The feed supplement of claim 1, wherein the plasma further comprises porcine plasma.

6. A method of enhancing performance of weanling pigs and calves comprising the administration to said weanling pigs and calves of an effective amount of a feed supplement comprising a combination of plasma selected from the group consisting of bovine and porcine, and a spray-dried egg product, said egg product obtained from an avian hyperimmunized with one or more antigens selected from the group consisting of Salmonella, *E. coli*, Clostridium and rotavirus.

7. The method of claim 6, wherein the antigens are further selected from the group consisting *Salmonella typhimurium, Salmonella cholerasius, Salmonella enteritidus, Salmonella dubin, Salmonella heidleberg, Escherichia coli* J5, *Escherichia coli* 987P, *Escherichia coli* F41, *Escherichia coli* K88, *Escherichia coli* K99, *Escherichia coli* 1362, *Escherichia coli* 2134, *Escherichia coli* 263, *Escherichia coli* J5, *Clostridium perfingens* and porcine rotavirus.

8. The method of claim 6, wherein the concentration of plasma comprises approximately 97% of said supplement.

9. The method of claim 6, wherein the concentration of egg product comprises approximately 3% of said supplement.

10. The method of claim 6, wherein the plasma further comprises porcine plasma.

* * * * *

UNITED STATES PATENT AND TRADEMARK OFFICE
CERTIFICATE OF CORRECTION

PATENT NO. : 6,569,447 B2
DATED : May 27, 2003
INVENTOR(S) : Julie A. Kisic and Thomas E. Shipp It is certified that error appears in the above-identified patent and that said Letters Patent is hereby corrected as shown below:

Column 10,
Line 57, delete "guts" and insert -- gilts -- therefor.

Column 11,
Table, Line 27, delete "231" and insert -- $231^b$ -- therefor.

Signed and Sealed this

Second Day of September, 2003

JAMES E. ROGAN
*Director of the United States Patent and Trademark Office*